United States Patent [19]

Lipinski

[11] 4,277,359

[45] Jul. 7, 1981

[54] WATER TREATMENT TO INHIBIT CORROSION AND SCALE AND PROCESS

[75] Inventor: Richard J. Lipinski, Aurora, Ohio

[73] Assignee: Mogul Corporation, Chagrin Falls, Ohio

[21] Appl. No.: 13,254

[22] Filed: Apr. 4, 1979

[51] Int. Cl.$^3$ .............................................. C02B 5/06
[52] U.S. Cl. ...................... 252/181; 252/82; 252/86; 252/175; 252/180; 252/388; 252/391; 252/394; 210/699
[58] Field of Search ................. 252/180, 175, 181, 86, 252/82, 388, 391, 394; 210/58

[56] References Cited

U.S. PATENT DOCUMENTS

| | | | |
|---|---|---|---|
| 3,514,376 | 5/1970 | Salutsky | 252/180 UX |
| 3,696,044 | 10/1972 | Rutledge | 252/180 |
| 4,062,796 | 12/1977 | Gardner et al. | 252/180 |
| 4,098,720 | 7/1978 | Hwa | 252/181 X |
| 4,168,230 | 9/1979 | Farley | 252/180 X |

Primary Examiner—Mayer Weinblatt
Attorney, Agent, or Firm—Fay & Sharpe

[57] ABSTRACT

This invention is directed to a corrosion inhibiting composition and to a process for inhibiting corrosion and the deposition of mineral scale on metal in aqueous systems which comprises adding to the water effective amounts of a water soluble polymer comprising acrylic acid characterized by molecular weights ranging up to about 2500. The polymer comprises vinyl monomer in excess of about 90%, i.e. acrylic acid, in combination with minor amounts of phosphorous acid and derivatives thereof.

14 Claims, No Drawings

WATER TREATMENT TO INHIBIT CORROSION AND SCALE AND PROCESS

This invention is directed to a novel corrosion inhibiting composition and to a process for inhibiting corrosion and the deposition of mineral scale on metal in various aqueous systems and, more particularly, to a process for protecting metals in the presence of water by adding as essential to the water an effective amount of phosphorous acid with a water soluble acrylic acid polymer of relatively low molecular weight, e.g., between 500 and about 2500, with the principal monomeric therein being derived from acrylic acid. Other (amounts less than 10% by weight) monomers interpolymerizable therewith include acrylamide monomers, vinyl phosphonic acid monomers and vinyl sulfonic acid monomers, as well as pre-polymerized acrylic acid polymers which have been modified with $PCl_3$. Upon steam distillation, the products obtained contain from traces to about 5% of combined phosphonate along with traces of up to about 20% by weight of phosphorous acid after hydrolysis of any residual $PCl_3$.

The surprising discovery was that small amounts of $H_3PO_3$, in combination, contributed most remarkably to the increase in the corrosion inhibition in conjunction with the acrylic polymers which had been known to be useful as corrosion inhibitors in industrial waters or non-potable waters. The corrosion inhibiting compositions of this invention minimize mineral deposits generally formed on metal and may be used in various water systems including, for example, air conditioning, steam generating plants, refrigeration systems, heat exchange apparatus, engine jackets, pipes, etc.

It is an object of this invention to provide a composition for inhibiting corrosion and to minimize the deposit of mineral scale on metals in direct contact with aqueous systems.

It is another object of this invention to provide a process for inhibiting corrosion and mineral deposition on metal in contact with corrosive aqueous systems.

It is a further object of this invention to provide a process for inhibiting the corrosion and tarnishing of metals and particularly metals including copper by utilizing a small, but effective, amount of a polymer of acrylic acid, in combination with minor amounts of phosphorous acid, $H_3PO_3$.

The art has not previously recognized the unique quality of phosphorous acid as a corrosion inhibiting component in conjunction with polymers of acrylic acid. Obviously, as most industrial treatment waters are preferably neutral, or slightly on the alkaline side, the alkali metal salts of phosphorous acid are effective also in treating water.

Corrosion has been defined as a destructive attack on metal involving an electrochemical or chemical reaction of the metal with its environment. More specifically, an electrochemical attack on a metal surface is the wearing away and undercutting of the metal, which is accelerated after the protective coating, e.g., the oxide film, is removed by the corrosive medium. Other types of corrosion include cavitation and erosion where in addition to an electrochemical reaction the condition of the aqueous systems are such that the continuous flow causes cavities where high pressure areas develop causing pressure and shock resulting in a pitted metal surface. This type of corrosion generally is found in water pumps, propellers, turbine plates, etc. Further, erosion of the metal surface will occur if the medium contains suspended solids which impinge on the surfaces of the metal as the fluid is transported through the pipes thereby removing any protective film and exposing the metal to corrosion.

Presently, many corrosion inhibiting compositions are being used at low levels in an attempt to control corrosion. Often they contain, in addition, an agent for control of mineral scale formation which has a tendency to increase the rate of corrosion and, therefore, stronger corrosion inhibitors at higher concentrations are used in order to obtain satisfactory results. The combination of this invention is effective at low concentrations and is free from environmental contamination, yet, also has the capability to inhibit scale deposit.

Additionally, it has been found that further formulations of the polymer of acrylic acid and phosphorous acid can be enhanced, in both corrosion inhibition and scale formation, by including in the concentrate for treating non-potable water minor quantities of other inhibiting additives. Of these additives, two have been found to be outstandingly, but not exclusively, useful.

The first is a class of organic chelates or sequestering agents characterized as having both carboxlyic acid groups and at least one hydroxyl group. While organic chelating compounds generally have been used, the organic chelates having both the carboxyl group as well as at least one hydroxyl group is preferred. Illustrative of the group, but not exhaustive thereof, are the citrates, gluconates, citric acid, gluconic acids, glycolic (hydrox acetic) acid, hydroxy butyric acid, lactic acid, malic acid, tartaric acid and their salts. The sequestering agents including ethylene diamine tetracetic acid and its related salts are useful but are not in the preferred class of chelates. When these organic chelates are added to the compositions of this invention as first described so that the treated water contains amounts in the range of parts per million (ppm), a synnergistic boost in corrosion inhibition was obtained in both Filtered Plant Water (FCPW—filtered Chagrin Plant Water) and Open Cell water (OCW—distilled water contained 50 ppm of chloride ion). These chelating agents appear to assist in inhibiting pitting as well as scale deposition along with their synnergistic contribution to overall corrosion inhibition.

It has also been found additionally advantageous to improve the corrosion inhibition of the composition of this invention to include with the polymer of acrylic acid and phosphorous acid relatively sizeable quantities of nitrate ion in the form of the alkali metal salts of nitrous acid. Sodium nitrite is commonly selected. It is preferred not to use volatile alkali (ammonium) salts particularly where copper metal parts may be in contact with the treated process water. The amount of nitrite salt is also not critical and may be varied from zero to as much as 55% of the composition or concentrate without apparent overload. However, from 5 to 50 parts per million of active nitrite ion on this treated water is adequate for most purposes. Active nitrite ions as low as 3 ppm were found to inhibit pitting—even to visual examination in conjunction with the acrylic polymer-phosphorous acid composition.

From experience with the compositions of this invention, no advantage has been found by including compounds such as sodium hexametaphosphate. It is also detrimental to include other inorganic phosphorous compounds such as tripolyphosphate and sodium tripolyphosphate. Indications are that inorganic phosphate salts are better to be avoided. In addition, tetraborate, zinc sulfate, chromic acid silicates (Na$_2$O 3.3 SiO$_2$), etc. were apparently detrimental when used in combination with the acrylic acid polymers and phosphorous acid, H$_3$PO$_3$.

Among the screened additives indicating additional advantage over the polyacrylate and H$_3$PO$_3$ were water soluble molybdate salts which assisted in improving the pitting tendencies of the test metals.

Other known organic and/or inorganic corrosion inhibitors may be used in small but effective amounts. The organic inhibitors indicating some added merit include, for example, the azoles and, more particularly, the triazoles such as benzotriazole, tolyltriazole and other azoles such as pyrazoles, imidazoles, oxazoles, thiazoles and combinations thereof. The triazoles which may be employed include the water-soluble 1,2,3-triazoles or a substitutes 1,3,3-triazole including benzotriazole, tolyltriazole, 4-phenyl-1,2,3-triazole, 1,2-naphthotriazole, 4-nitrobenzotriazole, etc. The pyrazoles include any of the water-soluble compounds such as 3,5-dimethyl pyrazole, 6-nitroindazole, 4-benzyl pyrazole and the like. The imidazoles include the water-soluble compounds such as benzimidazole, 5-methyl benzimidazole, 3-phenyl imidazole, 4-methyl imidazole and the like. The oxazoles include any water-soluble compound such as 2-mercaptoxazole, 2-mercaptobenzoxazole, etc. The thiazoles include 2-mercaptothiazole, 2-mercaptobenzotriazole, benzothiazole, etc.

In addition to the corrosion problems, cooling-water systems, for example, have other difficulties depending on the impurities present in the water. If the water is vaporized, scale formation may be a problem. This can be avoided by either softening the water, e.g., ion-exchange treatment, or by complexing the scale formers by adding dispersing agents such as lignosulfonates, polysilicates, a hydrolyzed polyacrylonitrile and, more particularly, the addition of low molecular weight acrylic acid polymers. For example, it may be desirable to add to the water a biocide to inhibit the growth of algae and a polymeric dispersant, such as a sulfonated polystyrene, a sulfonate and other acrylic polymers, e.g., polyacrylamide and various other water-treating additives known in the art.

It will be noted that the compositions of this invention are substantially free of toxic heavy metals, zinc and chromium being illustrative. No phosphates and less phosphorous are present in the effluent streams than water treatment compositions now known to be in commercial use. The formulas of this invention meet a large and desirable number of environmental parameters, more than most prior art water treatment materials presently known.

The compositions are suitable for reducing the corrosion of iron, copper, aluminum, zinc and various alloys of these metals, e.g., steel and other ferrous alloys, such as brass and the like which are generally used in aqueous systems.

The following examples illustrate some of the best modes known to practice the invention, but it is clear that not all modes of practice have been subject to exhaustive scientific study. A series of polymers whose principal monomeric unit is derived from acrylic acid were obtained from commercial sources (principally the B. F. Goodrich Co.) which has a molecular weight of above 500 and less than about 5000.

These polymers of acrylic acid are identified for use in the examples in accordance with the following:

TABLE 1

| Polymer Identification | Known identifying information |
|---|---|
| Polymer A Class (BFG K-752) | An unmodified acrylic acid polymer of about 1800 Ml. Wt. with an excess of 90% acrylic acid monomer. |
| Polymer B (BFG CS5517) | Polymer A Class. Treated with PCl$_3$ and hydrolyzed. No bound P found. Analysis - 9% total P. |
| Polymer C (BFG CS5543) | Polymer A Class. PCl$_3$ treated and hydrolyzed 15.6% total P; 3% + 0.2% bound P (Phosphonic acid group). 13% P as H$_3$PO$_3$. |
| Polymer D (BFG K-752) | Polymer A Class + 11% P as H$_3$PO$_3$ added without chemical processing. |
| Polymer E (BFG K-752) | Polymer A Class + 14.3% P as H$_3$PO$_3$ added without chemical processing. |
| Polymer F (BFG 5543-B) | Polymer A Class. Treated with PCl$_3$ and hydrolyzed. Total P = 6.6% by analysis. 3% P present in polymer bound. 3.5% free P as in H$_3$PO$_3$. |
| Polymer G (BFG 5543-C) | Polymer A Class. Treated with PCl$_3$ and hydrolyzed. 15.6% total P by analysis. 2.6% of total P bound to polymer phosphonate 13% P as H$_3$PO$_3$. |
| Polymer H (Cyanamer P-70 BFG) | Copolymer of acrylic acid and acrylamide Mo. Wt. about 1000. |

The PCl$_3$ treatment of the substantially acrylic acid polymers were produced by treating one part of the polymer by weight with from about 28% of the polymer weight as PCl$_3$ to about 130% of the polymer weight as PCl$_3$ in tetrahydrofurfural as the solvent-diluent at reflux temperatures for 2 to 2½ hours with subsequent hydrolysis of unreacted PCl$_3$ with varying quantities of water. The reaction product was then steam distilled to about 22% by weight of water. Note: H$_3$PO$_3$ results from hydrolysis of PCl$_3$. Where bound phosphonates were found, the formula was believed to correspond to the following:

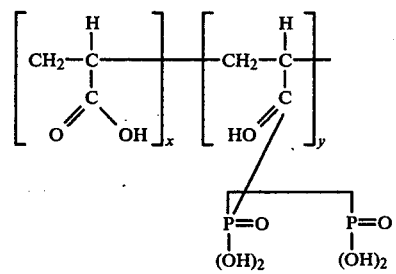

where x ranges up to about 24; and where y ranges up to about 1 (or less).

The foregoing Polymers (A through G) were formulated into a series of water treatment products and tested for inhibition of corrosion and scale deposition by electrochemical test methods to yield comparative data, reported primarily as percent (%) corrosion inhibition in the foregoing two test waters. The first, identified as OCW (Open Cell Water) is distilled water containing 50 ppm (parts per million) of chloride ion. The second, identified as FCPW (Filtered Chagrin Plant Water) has the following analysis:

| | |
|---|---|
| (CaCO$_3$) | = 162 |
| Ca (CaCO$_3$) | = 108 |
| Mg (CaCO$_3$) | = 54 |
| Cl (Cl—) | = 74 |
| PHT, Alk (CaCO$_3$) | = n |
| Mo, Alk (CaCO$_3$) | = 218 |

-continued

| | | |
|---|---|---|
| pH | = | 7.7 |
| Specific Conductance | = | 780 |

Polymer H was used in a later test procedure and also found useful for the purposes stated herein.

Corrosion inhibition levels were determined on these polymers using a three electrode electrochemical test method. The procedure employed is as follows:

Corrosion potentials of 1010 carbon steel test coupons are monitored against a standard calomel reference electrode in a specific water type at 100°±2° F. and a pH range of 7.5 to 8.0. Corrosion currents corresponding to these potentials are measured against a Nichrome wire getter electrode with a zero resistance ammeter at polarization potentials of less than 20 millivolts. Using Faradays Law, these corrosion currents are converted to total weight loss values. Percent corrosion inhibition levels are then calculated using the following expression:

$$\% \text{ Corr. inhib.} = \text{Wght. loss (minus inhib.)} - \frac{\text{Wght. loss (plus inhib.)}}{\text{Wght. loss (minus inhib.)}} \times 100$$

When m.p.y. is reported, the initials signify weight loss in milligrams per day per square decimeter times a factor (1.44) divided by the specific gravity of the test coupon material and is derivative from the above Electrochemical Test data.

EXAMPLE I

Polymer A, an unmodified homopolymer of acrylic acid containing no phosphorous was used in a direct test against Polymer C containing about 11% of free phosphorous acid resulting from $PCl_3$ treatment and hydrolysis of an acrylic acid homopolymer as 10, 15, 20, 25 and 30 parts polymer per million parts of FCPW. After 19 hours at 100°±2° F. using electrochemical test method and pH of 7.5 (adjusted), the following results were obtained:

TABLE 2

| Test Polymer | % $H_3PO_3$ | % Corrosion Inhibition | | | | |
|---|---|---|---|---|---|---|
| | | 10 PPM | 15 PPM | 10 PPM | 25 PPM | 30 PPM |
| A | 0.0 | 29.1 | 22.2 | 58.2 | 75 | 90 |
| C | 11.0 | 33.5 | 41.7 | 70.8 | 90 | 93.3 |

EXAMPLE II

Electrochemical corrosion tests were run in OCW water at 5, 10, and 15 ppm levels wherein Polymer D contains merely a physical admixture of phosphorous acid. Polymer A is the straight acrylic acid homopolymer.

TABLE 3

| Test Polymer | % P as $H_3PO_3$ | % Corrosion Inhibition | | |
|---|---|---|---|---|
| | | 5 PPM | 10 PPM | 15 PPM |
| Polymer A | 0 | 33.3 | 33.3 | 92.5 |
| Polymer B | 9% | 33.3 | 93.3 | 92.5 |
| Polymer D | 11% | 33.3 | 83.5 | 93.3 |

Polymer B varies over Polymer D in that the $PCl_3$ treatment in this instance failed to produce measurable phosphonic acid bound in the instant polymer. At 10 ppm, there is strong indication of value in the initial chemical treatment of the acrylic polymer. With the Open Cell Water, the corrosion inhibition at 15 ppm fails to show appreciable difference in the method of inclusion of $H_3PO_3$ in the admixture.

A further test run, similar to the above, but replacing Polymer B with Polymer C (Polymer C having some 3%±0.2%) bound phosphonate in conjunction with the free $H_3PO_3$ from hydrolysis of $PCl_3$, in situ, shows practically no appreciable increase in % corrosion inhibition. There was about 1.7% increase for Polymer C at 10 and 15 ppm over the mere physical admixture. The increased percentage is consistent with Example IX.

EXAMPLE III

Using the electrochemical corrosion test method as described, the following table sets out data on 19 hour test runs made and therein summarized.

TABLE 4

| Test Polymer | % P as $H_3PO_3$ | % Corrosion Inhibition | | | | |
|---|---|---|---|---|---|---|
| | | OCW | | FCWP | | |
| | | 5 (ppm) | 10 (ppm) | 15 (ppm) | 25 (ppm) | 30 (ppm) |
| A | 0 | 25 | 40 | 58 | 75 | 90 |
| F | 3.6 | 56.7 | 90 | 62 | — | 90 |
| B | 9.0 | 77.0 | 90 | 82 | — | 90 |
| C | 13.0 | 77.0 | 87 | 82 | 90 | 90 |
| G | 13.0 | 80.0 | 88 | 82 | — | 90 |

It is observed that a general increase above 5 ppm of polymer of acrylic acid increased corrosion inhibition in both test waters. Also one observes that at low ppm there is a marked increase in corrosion inhibition, showing the effect of phosphorous acid $H_3PO_3$ inclusions. Thus, at 3.6% P as $H_3PO_3$ (Polymer F), 10 ppm of Polymer F were equivalent or better than 30 ppm of Polymer A without $H_3PO_3$.

Polymers C and G with the highest % (13%) of P as $H_3PO_3$ were not materially superior at 10 ppm to Polymer F at 3.6% P as $H_3PO_3$. This is an indication that about 25% of $H_3PO_3$ is optimally effective. Large amounts of phosphorous (as $H_3PO_3$) are not essential to optimum corrosive inhibition.

EXAMPLE IV

Following the same test procedures as in Examples I and II, Polymer C which contains about 3% P as bound phosphonate and about 13% P as free $H_3PO_3$ was checked out against the phosphate free Polymer A and the same polymer containing the same *total* phosphorous as Polymer C, but as free $H_3PO_3$ phosphorous acid (14.3 active). In this series, Open Cell Water (OCW) containing chloride was used as the test water.

TABLE 5

| Test Polymer | % Phosphorous total | OCW % Corrosion Inhibition | | |
|---|---|---|---|---|
| | | 5 ppm | 10 ppm | 15 ppm |
| A | 0 | 26.7 | 33.3 | 33.3 |
| C | 15.6 | 33.3 | 91.7 | 91.7 |
| E | 14.3 | 30.0 | 90.0 | 90.0 |

This run indicated measurable advantage inherent in bound phosphonate plus $H_3PO_3$ over $H_3PO_3$ alone at all test levels of bound phosphonate plus $H_3PO_3$.

The foregoing Examples establish that small amounts of phosphonate group bound into substantially 90% or more of an acrylic acid polymer enhance the corrosion inhibition of the polymer over non-bound (phosphonate) above. However, while the enhancement appears modest, it should be appreciated that the % corrosion inhibition improvement is observed at relatively low levels (ppm) and at very high levels of inhibition of the order of 90%. Thus, while differences are of the order of 1% to 3% by inclusion of the order of 3%±0.2% bound phosphonate, it should be considered that as one approaches perfection, increases toward that goal of perfection become increasingly difficult to achieve.

Thus, when the art is able to either improve the % corrosion inhibition at a given level of chemical treatment, or maintain a high level of % corrosion inhibition and reduce the ppm of chemical treatment, such improvements materially advance the state of the art of corrosive inhibition of non-potable water treatment. The examples herein set out demonstrate improvements over the initial discovery of the use of a polymer of acrylic acid alone. They demonstrate polymers of acrylic acid containing in excess of 90% of the parent monomer as acrylic acid also containing phosphorous acid $H_3PO_3$, either by treatment of the polymer with $PCl_3$ and hydrolysis, or by mere physical admixture therewith possess advantages as are shown and described herein.

EXAMPLE V

A first study relates to the use of water soluble organic hydroxy acids as chelates in combination with the polymers of acrylic acid with phosphorous acid. In this series, both OCW (Open Cell Water) and FCPW (Filtered Chagrin Plant Water) were used in the electrochemical tests run 19 hours at 100°±2° F., pH adjusted to 7.5 with NaOH. The test coupons were 1010 carbon steel. Citric acid was used as the chelant or sequestrant.

TABLE 6

| Test Materials (Citrate) Chelate level (ppm) | % Corrosion Inhibition | | | |
|---|---|---|---|---|
| | FCPW | | OCW | |
| | Polymer C 25 ppm | Polymer D 25 ppm | Polymer C 25 ppm | Polymer A 25 ppm |
| 0 | 90 | 74.2 | 86 | 82* |
| 4 | 93.3 | 92.0 | 88 | 86 |
| 8 | 95.0 | 92.0 | 90 | 86 |
| 12 | 93.3 | 91.6 | 90 | 86 |
| 16 | 93.3 | 93.3 | 90 | 88 |

*Pitting and initial rust formation are noted to be more prevelant with Polymer A - above.
*No free phosphorous acid or phosphonate elements are present in Polymer A.

EXAMPLE VI

This study relates to the use of alkali metal nitrites in conjunction with polymmers of acrylic acid containing in excess of 90% acrylic acid as the parent monomer.

All elements of the tests were parallel with Example V with the exceptions as noted.

TABLE 7

| Test Materials Nitrites (active) ppm level | % Corrosion Inhibition | | | |
|---|---|---|---|---|
| | FCPW | | OCW | |
| | Polymer C | Polymer A | Polymer C | Polymer A |
| | (25 ppm in each polymer use) | | | |
| 0 | 88 | 68 | 90 | 83* |
| 5 | 95 | 92 | 91.6 | 86.7 |
| 10 | 95 | 92 | 93.3 | 90.0 |
| 15 | 94 | 91 | 92.0 | 91.0 |

TABLE 7-continued

| Test Materials Nitrites (active) ppm level | % Corrosion Inhibition | | | |
|---|---|---|---|---|
| | FCPW | | OCW | |
| | Polymer C | Polymer A | Polymer C | Polymer A |
| | (25 ppm in each polymer use) | | | |
| 20 | 94 | 91 | 93.3 | 91.6 |

*Pitting and initial rust formation more prevelant with Polymer A above. (No free phosphorous acid or phosphonate elements present in Polymer A).

Note that the optimum nitrite appears at about 10 ppm, there is a synnergistic effect observed when the phosphorous acid is present with the nitrite in conjunction with polymers of acrylic acid.

EXAMPLE VII

This study embraces use of both chelate and nitrite in a study paralleling Examples V and VI in details of testing procedure.

TABLE 8

| Test Materials Chelate Nitrites (Active) parts per million) | % Corrosion Inhibition | | | |
|---|---|---|---|---|
| | FCWP | | OCW | |
| | Polymer C | Polymer A | Polymer C | Polymer A |
| | (25 ppm of polymer in each case) | | | |
| 0 0 | 87.9 | 75.0 | 88 | 82* |
| 4 5 | 95.0 | 91.7 | 90 | 84 |
| 8 10 | 95.4 | 93.0 | 92 | 88 |
| 12 15 | 96.7 | 95.4 | 92 | 90 |
| 16 20 | 96.7 | 95.8 | 94 | 91 |

It is to be observed that there is a synnergistic effect in all cases where the combination of a chelate with the nitrite is present in the acrylic polymer with the presence of $H_3PO_3$. It should also be observed that with the $H_3PO_3$ inclusion, there is a definite observable improvement over either chelate or nitrite alone with Polymer C. Percent inhibition values of almost 97% have not been heretofore reported.

EXAMPLE VIII

Using similar testing procedures as in Example V, VI and VII in conjunction with Polymer C and a wide variety of additives commonly used, the following data is of interest.

TABLE 9

| Additive Alone 9 ppm | Test Material + Polymer C (9 ppm + 10 ppm) (Control Mean Polymer C alone = 86.6, Std. Devs. = 2.9 | % Corrosion Inhibition Combination (19 ppm) |
|---|---|---|
| 25 | Tripoly phosphate | 80 |
| 0 | Tetraborate | 83.3 |
| 66.7 | Chromic Acid | 70.0 |
| 0 | Silica ($Na_2O.3.3\ SiO_2$) | 85.5 |
| 33.3 | Sodium tripoly phospate (spray dried) | 86.7 |
| 33.3 | Zinc Sulfate | 86.7 |
| 73.3 | Amino tri (Methylene Phosphonic Acid) | 86.7 |
| 70.0 | 1-Hydroxyethylene 1,1 diphosphonic acid | 85.8 |
| 33.3 | Polymer A | 88.3 |
| 9.0 | Polymer H | 88.3 |

From this information, it would appear that it cannot be predicted, without experience, the additives which may be of measurable value in combination with the disclosed polymers of acrylic acid (above 90% acrylic acid monomer) containing corrosion inhibiting amounts of $H_3PO_3$.

From the information, it would appear that the amount of various additives of this invention in treated water to be the most effective can be varied over relatively non-critical broad ranges. As all indicated useful components are effective in small amounts, it is helpful to examine the quantitative relationship initially on the basis of parts of additive treatment in parts by weight per million parts of water. Economically viewed from effectiveness on corrosion inhibition and scale deposition, more than 500 pm of any component is normally considered effective. Viewed from the standpoint of being able to ascertain commercial value at the least long term effective amount, one also does not arrive at a predictable critical low ppm figure.

It is, therefore, more a matter of general quantitative interest that the following observations are set forward. While as low as 1 ppm of acrylic polymer with as little as 0.5 ppm of phosphorous acid ($H_3PO_3$) is effective measurably to decrease corrosion rate in laboratory testing, larger ratios of additive to water are more practical. As low as 5 ppm of an entire basic formula may be effective and sufficient for some water treatment, whereas, in some severely demanding end uses 100 to 500 ppm of a given formulation may better serve the specific treatment demand.

The following Table is intended as purely illustrative of a treated water composition using the maximum end of quantitative amounts of components as compared with a possible maximum treated water formulation. Preferred amounts are most likely to be found within these high and low ppm figures.

TABLE 10

|  | Low (ppm) | High |
|---|---|---|
| Polymer of Acrylic Acid | 1 | 40 |
| Phosphorous Acid | 0.5 | 35 |
| Active Nitrite Ion | 5 | 40 |
| Chelate (Organic) | 3 | 20 |
| (Other Useful Additives) | | |
| Triazole | 0.2 | 20 |
| Molybdate | 0 | 30 |
| Amino tri (methylene phosphonic acid) | 0 | 10 |
| 1 Hydroxyethylidene 1, -1 diphosphonic acid | 0 | 10 |
| Hexamethylene diamine tetra (methylene phosphonic acid) | 0 | 10 |

Practical considerations dictate concentrates of water treating compositions will be sold and used in a fluid (aqueous) state having the active components (solids content) in solution or suspension therein to provide an easy liquid metering of the active concentrate material into the water to be treated. In such concentrates, the essential acrylic polymer suggested would likely be from about 10% to 50% or more of the active solids. The phosphorous acid, or its partial salts (e.g. $NaH_2PO_3$ and/or $Na_2HPO_3$) might be selected to constitute 10% to 25% as an optimum amount, but no advantage has been noted at more than 25% of the total polymer solids.

While the chelate and nitrite salts are not essential to the basic inventive combination and can be eliminated, superior corrosion inhibition results have been found if the chelate is not less than a minimum of about 3% and will be nearly maximum at an amount less than 50% of the nitrite if used, (or 30% if nitrates are not used) as a maximum. Under the nitrite (active) 6% of the total solids would be a useful figure with 50% not an impossibly large amount. A ratio of nitrite to chelate of 2/1 has been indicated as a favorable ratio to employ in development of commercially useful and valuable concentrates.

Amounts of the other beneficial additives in the concentrates (based on solids) can be useful in the over all combination when present from the 0-10 ppm in the ultimate treated water.

In the electrochemical test methods employed where the aqueous corrosive industrial water is city water supply at room temperature, any corrosion rate less than the untreated water is advantageous. Corrosion rates less than about 2 to 10 m.p.y. are useful. Treating additives that give data in this range or lower are considered excellent. However, corrosion inhibitive formulas which have higher test corrosion rates are commercially useful and may be of value under some plant conditions for reasons as indicated priorly.

The concentrates may also include other additive agents not directly concerned with corrosion inhibition and scale formation as are known. Illustrative are antifoaming agents, biocidal materials, viscosity adjuvants, dispersants, etc., all of which are not a part of the novelty of the compositions principally of interest.

This invention has been described by a number of specific embodiments. It is obvious there are variations and modifications which can be made without departing from the spirit and scope of the invention as set forth in the appended claims.

What I claim as my invention is:

1. A water composition for treating water to inhibit scale and corrosion of metals exposed thereto which comprises a major amount of a water soluble polymer derived from acrylic acid characterized by having a molecular weight ranging up to about 2500 and having over 90% by weight of acrylic acid monomeric units; and an amount of phosphorous acid and the salts thereof effective to enhance said inhibition.

2. A method of inhibiting and controlling corrosion and scale deposition in industrial non-potable water systems which comprises feeding the composition of claim 1 into such waters at a rate to provide an effective amount thereof, with said amount not being in excess of about 500 parts per million parts of the treated water.

3. A water treating composition useful to inhibit scale and corrosion in waters which comprises:
    (a) a water soluble acrylic acid polymer which consists essentially of at least 90% by weight of acrylic acid monomer said polymer having a molecular weight ranging from about 500 to about 2500; and
    (b) an amount but less than about forty percent by weight of the total composition of phosphorous acid and its water soluble salts; and
    (c) a minor amount of a carboxylic acid chelate having at least one hydroxyl substituent in the molecule.

4. A water treatment composition useful upon aqueous dilution to plural parts per million to inhibit scale and corrosion from developing in metals exposed to said non-potable waters which comprises:
    (a) a water soluble acrylic acid polymer which consists essentially of at least 90% by weight of acrylic acid monomer and has a molecular weight range from 500 to about 2500 and
    (b) an amount up to about 35% by weight of the total composition of phosphorous acid and its water soluble salts;

(c) an effective amount of a water soluble inorganic nitrite salt.

5. A water treatment composition useful upon aqueous dilution to parts per million to inhibit scale and corrosion developing on metals exposed to said non-potable waters which comprises:
(a) a water soluble acrylic acid polymer which consists essentially of at least 90% by weight of acrylic acid having an average molecular weight ranging from 500 to about 2500;
(b) an amount up to about 55% by weight of the total composition of phosphorous acid and its water soluble salts;
(c) an effective amount of an organic carboxylic acid chelate having at least one hydroxyl substituent; and
(d) an effective amount of a water soluble inorganic nitrite.

6. A method of inhibiting and controlling corrosion and scale deposition on metals in industrial, non-potable, water systems which comprises feeding the composition of claim 5 into such waters to provide from about 10 parts to about 500 parts of said composition per million parts by weight of treated water.

7. The composition of claim 5, wherein the ratio by weight of the chelate to nitrite salt is about 1 to 2.

8. The composition of claim 5, wherein the water soluble acrylic acid polymer is from about 10% to about 99% of the total weight of the composition.

9. The composition of claim 1, wherein the phosphorous acid is from about 1% to less than about 35% by weight of the acrylic acid polymer present.

10. An industrial non-potable water supply characterized by its inhibition of corrosion and scale deposition in contact with metal surfaces which comprises from 1 to about 200 ppm of a water soluble acrylic acid polymer, containing about 0.5 to 150 ppm of phosphorous acid, from zero to 100 ppm of a water soluble inorganic nitrite, from zero to 100 parts per million of an organic carboxylic acid chelate having at least one hydroxyl group in its molecule and from zero to 100 parts per million of further water treatment additives selected from the group consisting of azoles, molybdates and organic phosphonic acids and admixtures thereof.

11. The treated water of claim 10 wherein the azoles are triazoles.

12. The treated water of claim 11, wherein the triazoles are selected from the group consisting of benzotriazole and tolyltriazole.

13. The composition of claim 1, wherein the water soluble polymer contains over 90% by weight of acrylic acid monomer units and at least a part of the remaining monomer units of the said polymer are phosphonated polymerizable monomer units interpolymerized with the said 90% or more acrylic acid monomer moiety.

14. The composition of claim 1, wherein the water soluble polymer containing over 90% by weight of an acrylic acid monomer is chemically phosphonated but to a level less than about 5% bound P in said polymer calculated as $H_3PO_3$.